United States Patent [19]

Xiao et al.

[11] Patent Number: 5,086,110
[45] Date of Patent: Feb. 4, 1992

[54] AQUEOUS POLYURETHANE DISPERSIONS

[75] Inventors: Han X. Xiao, Farmington Hill; Shi Yang, Ferndale, both of Mich.

[73] Assignee: E. I. Du Pont de Nemours and Company, Wilmington, Del.

[21] Appl. No.: 418,405

[22] Filed: Oct. 6, 1989

[51] Int. Cl.$^5$ .............................................. C08G 18/10
[52] U.S. Cl. ..................................... 524/840; 528/76; 528/83
[58] Field of Search ....................... 528/61, 83, 65, 66, 528/76; 521/51, 172; 524/840

[56] References Cited

U.S. PATENT DOCUMENTS 4,183,836 1/1980 Wolfe ................................. 260/29.2
4,590,219 5/1986 Nissen et al. ........................ 521/51

Primary Examiner—Maurice J. Welsh
Assistant Examiner—Shelley Wright

[57] ABSTRACT

Waterborne polyurethane made using 1,12-dodecanediisocyanate, and prepolymers of such polyurethanes.

2 Claims, No Drawings

AQUEOUS POLYURETHANE DISPERSIONS

FIELD OF THE INVENTION

This invention relates to polyurethane prepolymers made by use of 1,12-dodecanediisocyanate hereinafter sometimes called $C_{12}DDI$, and to waterborne polyurethanes made from these prepolymers.

BACKGROUND OF THE INVENTION

Aqueous polyurethane dispersions have been known as coating compositions for many years. U.S. Pat. No. 4,183,836 to Wolfe discloses such dispersions and the method of their preparation. The present invention is an improvement over the polyurethane dispersions of Wolfe. The dispersions of the present invention are based on $C_{12}DDI$, and coatings made from such dispersions have high tensile strength, high elongation, high 180 degree peel strength and low water absorption.

SUMMARY OF THE INVENTION

The present invention is a prepolymer made by reaction of (A) 1 equivalent of 1,12-dodecanediisocyanate with (B) total 0.6–0.8 equivalent of the following active hydrogen compounds:

(a) alpha, alpha-dimethylolacetic acid or a homologue thereof, and (b) a polymeric glycol selected from poly(alkyleneoxy) glycols, polyester glycols and polybutadiene glycols having a weight average molecular weight of about 400–3000, and the amount of component (a) being about 0.08–0.25 hydroxyl equivalent per 100 g of total weight of all the reactants A and B.

This prepolymer may be reacted with a sufficient amount of a tertiary amine (free of substituents reactive with isocyanate groups) to convert 50 to 100% of the carboxyl groups of the prepolymer to carboxylate ions, then chain-extending the carboxylate ion containing prepolymer with about a stoichiometric amount based on free isocyanate groups of a diamine having at least two hydrogens attached to each nitrogen atom, and form a waterborne polyurethane dispersion that is useful as a coating material.

DETAILED DESCRIPTION OF THE INVENTION

Homologues of $\alpha,\alpha$-dimethylolacetic acid suitable in the process of the present invention must also be $\alpha,\alpha$-dimethylolcarboxylic acids. Under the conditions of the reaction, their hydroxyl groups react preferentially with isocyanate groups: carboxyl groups do react much slower. Representative $\alpha,\alpha$-dimethylolcarboxylic acids include $\alpha,\alpha$-dimethylolpropionic acid and $\alpha,\alpha$-dimethylolbutyric acid, the former being preferred because of its ready commercial availability.

Suitable polymeric glycols include poly(oxyalkylene) glycols which are commercially available from several sources under such trade names as, for example, Voranol ®, Niax ®, Pluronic ® and Terathane ®. Poly(1,4-oxybutylene) glycol is preferred. Polyester glycols, including poly(ε-caprolactone) glycol and polycarbonate glycols, can also be used. Poly(butylene adipate) glycol is preferred and available under trade names such as Rucoflex ® and Millester ®. Also polybutadiene glycol can be used.

The prepolymer is neutralized with a lower molecular weight tertiary amine. The lower molecular weight aliphatic tertiary amines, such as triethylamine, tripropylamines, or tributylamine, are preferred because they present less potential health hazard than aromatic amines, are stronger bases capable of readily forming salts with carboxyl groups, and have sufficient volatility for the practical operation of the process of the present invention. The step of neutralizing the prepolymer with tertiary amine is carried out at ambient temperature to avoid any side reactions of the isocyanate groups of the prepolymer.

The prepolymer can be diluted with a small amount of an organic, water-miscible solvent, for example, acetone, to help decrease the viscosity.

The chain-extending diamine is added to water at ambient temperature, and the neutralized prepolymer is then dispersed in the water containing the diamine. The diamines can be any diprimary, disecondary, or primary-secondary diamine. Examples of suitable diamines include ethylenediamine and higher alkylenediamines. Other suitable diamines are shown in Table 2 below. These aqueous dispersions of chain-extended polyurethane are storage-stable. At room temperature they can be stored for several months without undesirable changes taking place. These dispersions do not appear to the naked eye to contain discrete particles but rather look like cloudy or colloidal solutions. Their appearance depends to some extent on their ionic concentrations.

In the examples which follow, the waterborne polyurethane casting solutions were cast onto a glass mold coated with silicon rubber release agent. The mold was kept at room temperature overnight before placing it in an oven at 65° C. for 10 hours. The resulting film was then heated at 110° C. for 1 hr. to completely remove any residual water.

The tensile strength, elongation, peel strength and modulus were measured by means of an Instron-Tensile tester according to ASTM D-412 and the hardness measured by a Shore A Durometer. In the peel strength test a fabric was impregnated with the coating material and the fabric laminated to an aluminum sheet, cured and tested. The water absorption was measured by immersing the coatings in deionized water at room temperature for 24 hours and the percentage of water absorption calculated from the weight difference before and after immersion.

The Examples 1–4 and part one of Example 5 described the preparation and the properties of waterborne polyurethanes based on $C_{12}DDI$.

EXAMPLE 1

Effect of Various Neutralizing Agents

In a 500 ml reaction kettle equipped with a thermometer, mechanical stirrer and reflux condenser was charged 102.3 g (0.05 mole) of poly(oxytetramethylene) glycol (molecular weight =2046) 13.4 g (0.1 mole) of 2,2'-bis(hydroxymethyl)propionic acid; 52.9 g (0.21 mole) of 1,12 dodecanediisocyanate and 1 drop (around 0.03 g) of dibutyltin catalyst. The mixture was heated to 80° C. under a nitrogen atmosphere and maintained at 80–90° C. for 1-2 hr. until the NCO content reached the theoretic value. An appropriate amount of acetone was then added to the reaction mixture to decrease the viscosity. The reaction mixture was neutralized by 10.2 g (0.1 mole) of triethylamine and then the NCO terminated prepolymer was chain extended and dispersed in 500 ml water containing 6.84 g (0.06 mole) of 80 cis/20 trans-1,4-cyclohexane diamine. The following Table (Table 1) showed the effect of various neutralizing agents on the properties of waterborne polyurethane.

and C₁₂DA based waterborne polyurethane resulted in very good water resistance.

TABLE 1

Effect of various neutralizing agents

| Run No. | A* | COOH % | Ts psi | $M_{100}$ psi | $M_{300}$ psi | E % | 180° peel strength lb. in. | water absorption %, 24 hr/RT |
|---|---|---|---|---|---|---|---|---|
| 1 | TEA | 2.4 | 5236 | 761 | 1260 | 1044 | 20.7 | 4.3 |
| 2 | TPA | 2.4 | 3253 | 711 | 1309 | 717 | 14.0 | 3.5 |
| 3 | DMCA | 2.4 | 3286 | 596 | 1053 | 733 | 15.0 | 3.3 |
| 4 | DMEA | 2.4 | 2828 | 456 | 911 | 733 | 17.0 | 4.6 |
| 5 | DMEOA | 2.4 | 1718 | 485 | 658 | 861 | 14.5 | 6.9 |

*Neutralizing agent
TEA - Triethylamine
TPA - Tripropylamine
DMCA - Dimethylcyclohexylamine
DMEA - Dimethylethylamine
DMEOA - Dimethylethanolamine The results from Table 1 indicated that waterborne polyurethane based on triethylamine exhibited the best mechanical properties and the one based on dimethylethanolamine gave the lowest properties.

EXAMPLE 2

Effect of Different Diamine-Chain Extenders

The raw materials and the reaction conditions are the same as those described in example 1, run 1 except that the diamine chain extenders changed. The results are shown in Table 2.

TABLE 2

Effect of different diamine-chain extenders

| Run No. | Diamine * | Amount | Ts psi | $M_{100}$ psi | $M_{300}$ psi | E % | 180° peel strength lb. in. | water absorption %, 24 hr/RT |
|---|---|---|---|---|---|---|---|---|
| 1 | CHDA (trans) | 6.84 g | 3310 | 1399 | 2059 | 550 | 17.7 | 3.0 |
| 2 | IPDA | 10.2 g | 2426 | 1081 | 1592 | 600 | 15.0 | 3.7 |
| 3 | EDA | 3.6 g | 3061 | 926 | 1561 | 630 | 19.5 | 2.1 |
| 4 | TAPA | 7.52 g | 4054 | 923 | 1553 | 520 | 16.8 | 2.1 |
| 5 | CHDA (80/20) | 6.84 g | 5236 | 961 | 1260 | 1040 | 20.7 | 4.3 |
| 6 | MPMDA | 6.96 g | 3696 | 545 | 1151 | 670 | 27.0 | 6.3 |
| 7 | MMDA | 6.96 g | 4029 | 569 | 1033 | 670 | 19.5 | 2.7 |
| 8 | C₁₂DA | 12.0 g | 3037 | 502 | 981 | 700 | 16.5 | 1.9 |

*CHDA (trans) - 1,4-Cyclohexylenediamine (100% trans)
IPDA - Isophoronediamine
EDA - Ethylenediamine
TADA - Tris(3-aminopropyl)amine
CHDA(80/20) - 1,4-Cyclohexylenediamine (cis./trans. = 80/20)
MPMDA - 2-Methylpentamethylenediamine
HMDA - Hexamethylenediamine
C₁₂DA - 1,12-Dodecanediamine CHDA (80/20) based waterborne polyurethane give the highest tensile strength. MPMDA based waterborne polyurethane give the highest 180 peel strength

EXAMPLE 3

Effect of Various Polyols

The raw materials and the reaction conditions were same as that described in example 1, run 1 except that the type of polyols was changed. The amounts of various polyol in the runs of Table 3 are shown below:

| | |
|---|---|
| T-2000 | 102.3 g |
| Tone 0240 | 100.0 g |
| Millester | 104.8 g |
| Duracarb 124 | 93.5 g |
| Poly bd | 120.4 g |

The results are shown in Table 3.

TABLE 3

Effect of Various Polyols

| Run No. | Polyols * | Ts psi | $M_{100}$ psi | $M_{300}$ psi | E % | Hardness Shore A | water absorption %, 24 hr/RT |
|---|---|---|---|---|---|---|---|
| 1 | T-200 | 5236 | 788 | 1351 | 1044 | 85 | 4.3 |
| 2 | Tone-0204 | 4860 | 584 | 1054 | 1040 | 73 | 6.0 |
| 3 | Millester | 4256 | 1351 | 2420 | 706 | 98 | 4.9 |
| 4 | Duracarb 124 | 2134 | 839 | 1413 | 600 | 74 | 7.0 |

TABLE 3-continued

| | | Effect of Various Polyols | | | | | |
|---|---|---|---|---|---|---|---|
| Run No. | Polyols * | Ts psi | $M_{100}$ psi | $M_{300}$ psi | E % | Hardness Shore A | water absorption %, 24 hr/RT |
| 5 | Poly bd | 1783 | 1132 | 1783 | 300 | 90 | 5.1 |

*T-2000 - Terathane 2000 (MW = 2046)
Tone 0240 - Poly(caprolactone) glycol (MW = 2000)
Millester - Poly(1,6 hexanediol) adipate (MW = 2096) spec. co.)
Duracarb 124 - Poly(carbonate) glycol (MW = 1870)
Poly bd - Poly(butadiene) glycol (MW = 2400)

T-2000 based waterborne polyurethane exhibited high tensile strength and elongation. Millester based waterborne polyurethane gave the high modulus and hardness due to the high concentration of hydrogen bonding. Poly bd based polyurethane resulted in the lowest elongation due to the high functionality (more than 2).

EXAMPLE 4

Effect of Degree of Neutralization

T raw materials and the reaction conditions were the same as those described in the example 1, run 1 except that amount of neutralizing agent, triethylamine (TEA) and the degree of neutralization was changed. The results are shown in Table 4.

TABLE 4

| | Effect of Degree of Neutralization | | | | | | |
|---|---|---|---|---|---|---|---|
| Run No. | Degree of Neutralization* | Ts psi | $M_{100}$ psi | $M_{300}$ psi | E % | Hardness Shore A | water absorption %, 24 hr/RT |
| 1 | 100 | 4538 | 1252 | 1938 | 705 | 94 | 9.7 |
| 2 | 90 | 4496 | 1216 | 1982 | 667 | 92 | 8.3 |
| 3 | 80 | 4324 | 1412 | 2134 | 650 | 92 | 8.0 |
| 4 | 70 | 4609 | 1315 | 2056 | 710 | 86 | 7.4 |
| 5 | 60 | 3600 | 1265 | 2075 | 578 | 89 | 5.5 |
| 6 | 50 | 4205 | 1284 | 2026 | 705 | 89 | 4.7 |

*The degree of neutralization is the percentage of neutralized pendant carboxylic acid.

When the degree of neutralization was changed, most properties did not show an obvious change except that a decrease in the water absorption was observed.

EXAMPLE 5

Comparison of Properties of Waterborne Polyurethanes Based on Various Diisocyanates.

Various aliphatic diisocyanate were used to prepare anionic waterborne polyurethanes. The raw materials and formulations were identical, as shown below, in order to make a comparison between $C_{12}DDI$ and other aliphatic diisocyanate.

| | |
|---|---|
| Polyol: | poly(oxytetramethylene)glycol (T-2000) |
| NCO/OH: | 1.4/1.0 |
| Neutralizing agent: | triethylamine (TEA) |
| Degree of Neutralization: | 100 |
| Diamine Chain Extender: | 80/20 cis/trans-1,4-cyclohexane diamine (CHDA) |

The amounts of each raw material for various diisocyanates in this example are shown below:

| *Diisocyanate | $C_{12}DDI$ 44.1 g | $H_{12}MDI$ 45.85 g | CHDI 29.05 g | HDI 29.4 g | TMHDI 36.95 g |
|---|---|---|---|---|---|
| T-2000 | 102.3 g | ← | ← | ← | ← |
| DMPA | 10.5 g | ← | ← | ← | ← |
| Dibutyl tin | 1 drop | 2 drop | ← | 1 drop | 2 drop |
| TEA | 7.57 g | ← | ← | ← | ← |
| CHDA | 5.70 g | ← | ← | ← | ← |

*$C_{12}DDI$ = 1,12 dodecanediisocyanate; $H_{12}MDI$ = 4,4'-dicyclohexylmethane diisocyanate; CHDI = 90% cis/10% trans 1,4-cyclohexane diisocyanate; HDI = 1,6-hexamethylene diisocyanate; TMHDI = trimethylhexamethylene diisocyanate Reaction temperature and times as well as the amount of catalyst used in the preparation of the pendant carboxylic acid were compared based on various aliphatic diisocyanates. The viscosity of the prepolymer was also compared because it played an important role in the dispersion step. The lower the viscosity the more easy the dispersion. The amount of acetone will depend upon the viscosity of prepolymer. The results are shown in Table 5.

TABLE 5

| | Comparison of properties of anionic waterborne PU based on various aliphatic diisocyanate. | | | | |
|---|---|---|---|---|---|
| Diisocyanate | $C_{12}DI$ | $H_{12}MDI$ | CHDI(90/10) | HDI | TMHDI |
| Preparation of prepolymers | | | | | |
| Reaction temp., C. | 80–90 | 80–90 | 80–90 | 80–90 | 80–90 |
| Reaction time, hr | 1–2 | 5–6 | 4–5 | 1–2 | 4–5 |
| Catalyst(T-12), % | 0.02 | 0.04 | 0.04 | 0.02 | 0.04 |
| Viscosity of prepolymer | Low | High | High | High | High |
| Amount of Acetone, % | 0–10 | 20–30 | 20–30 | 10–20 | 10–20 |
| Dispersion of prepolymer | | | | | |
| Dispersability | Good | Poor | Good | Good | Good |
| Viscosity of waterborne | Low | Low | High | Low | Low |

TABLE 5-continued

Comparison of properties of anionic waterborne PU based on various aliphatic diisocyanate.

| Diisocyanate | $C_{12}DI$ | $H_{12}MDI$ | CHDI(90/10) | HDI | TMHDI |
|---|---|---|---|---|---|
| polyurethane Mechanical properties | | | | | |
| Ts, psi | 5126 | 3818 | 3550 | 2952 | 1269 |
| $M_{100}$, psi | 698 | 1035 | 992 | 475 | 221 |
| $M_{300}$, psi | 1251 | 1725 | 1460 | 832 | 252 |
| E, % | 1040 | 830 | 980 | 990 | 1680 |
| 180 peel strength, lb in. | 12.4 | 8.0 | 10.2 | 10.5 | 6.6 |
| Water absorption, % (RT × 24 hr.) | 4.6 | 8.4 | 8.6 | 6.5 | 17.2 |
| Raw Materials | | | | | |
| polyol (T-2000), % | 59.7 | 59.1 | 65.6 | 65.5 | 62.5 |
| DMPA, % | 6.0 | 5.9 | 6.59 | 6.58 | 6.28 |
| Diisocyanate, % | 26.3 | 27.1 | 19.1 | 19.2 | 22.96 |

The results (from Table 5) indicated that $C_{12}DDI$ based waterborne polyurethane exhibited the following advantages compared to other aliphatic diisocyanates:

1. Enhanced production efficiency (less reaction time and less amount catalyst).
2. Lower viscosity and less amount of acetone (even without using acetone) before dispersion. This will avoid the recollection of acetone by distillation, resulting in high production efficiency.
3. Good dispersability means that $C_{12}DDI$ based prepolymer will be easily dispersed in water.
4. Low viscosity of final waterborne polyurethane and high elongation of the film result in the possibility to use a high amount of filler for a decrease in the cost and the improvement of properties.
5. High tensile strength, 180° peel strength and low water absorption were observed in $C_{12}DDI$ based waterborne polyurethane.
6. Lower amounts of DMPA and polyol were used in the preparation of waterborne polyurethane (compared to CHDI, HDI, and TMHDI). Also, a lower amount of diisocyanate was used in the preparation of waterborne polyurethane compared to $H_{12}MDI$.

We claim:

1. A prepolymer made by reaction of (A) 1 equivalent of 1,12-dodecanediisocyanate with (B) total 0.6–0.8 equivalent of the following active hydrogen compounds:
   (a) alpha, alpha-dimethylolacetic acid or a homologue thereof,
   (b) a polymeric glycol selected from poly(oxyalkylene)glycols and polyester glycols having a weight average molecular weight of about 400–3000, and the amount of component (a) being about 0.08–0.25 hydroxyl equivalent per 100 g of total weight of all the reactants A and B.

2. A composition obtained by mixing an isocyanate-terminated, carboxyl group-containing prepolymer made by reaction of (A) 1 equivalent of 1,12-dodecanediisocyanate with (B) total 0.6–0.8 equivalent of the following active hydrogen compounds:
   (a) alpha, alpha-dimethylolacetic acid or a homologue thereof,
   (b) a polymeric glycol selected from poly(oxyalkylene)glycols and polyester glycols having a weight average molecular weight of about 400–3000, and the amount of component (a) being about 0.08–0.25 hydroxyl equivalent per 100 g of total weight of all the reactants A and B, with an aqueous solution of a sufficient amount of a tertiary amine, to convert 50–100% of the carboxyl groups of the prepolymer to carboxylate ions, then chain-extending the prepolymer by reacting the remaining isocyanate groups with about a stoichiometric amount based on free isocyanate groups of a diamine having at least one hydrogen attached to each nitrogen atom.

* * * * *